United States Patent [19]

Richardson et al.

[11] 4,103,698
[45] Aug. 1, 1978

[54] BOTTLE LABEL REMOVING DEVICE

[75] Inventors: Bruce E. Richardson; Rudy Oetliker, both of London, Canada

[73] Assignee: Labatt Breweries of Canada Limited, London, Canada

[21] Appl. No.: 828,282

[22] Filed: Jun. 29, 1977

[51] Int. Cl.² .............................................. B08B 3/02
[52] U.S. Cl. .................................. 134/73; 134/104; 134/126; 134/152
[58] Field of Search ................................... 134/72–73, 134/104, 125–126, 152

[56] References Cited

U.S. PATENT DOCUMENTS

| 813,012 | 2/1906 | Loew | 134/126 X |
|---|---|---|---|
| 1,775,003 | 9/1930 | Soelch | 134/73 X |
| 2,710,818 | 6/1955 | Winters | 134/104 X |
| 4,010,774 | 3/1977 | Fischer | 134/104 |

Primary Examiner—Robert L. Bleutge

[57] ABSTRACT

An apparatus is described for removing and collecting labels from bottles while the bottles are being cleaned prior to being fed into a filling line in a bottling plant. During cleaning, the bottles are transported in inverted position in pockets of a pocket conveyor through a series of caustic baths. To avoid contaminating these baths with freed labels, they are removed by sprays while the bottles travel between a pair of baths. The novel device includes downwardly directed spray for spraying rinsing solution on the bottles and a collecting trough beneath the sprays and pockets to collect the rinsing solution and labels. To permit free passage of the labels out of the pockets, a cam mechanism is provided which lifts the bottle shoulders out of engagement with the pockets while the labels are being removed.

7 Claims, 5 Drawing Figures

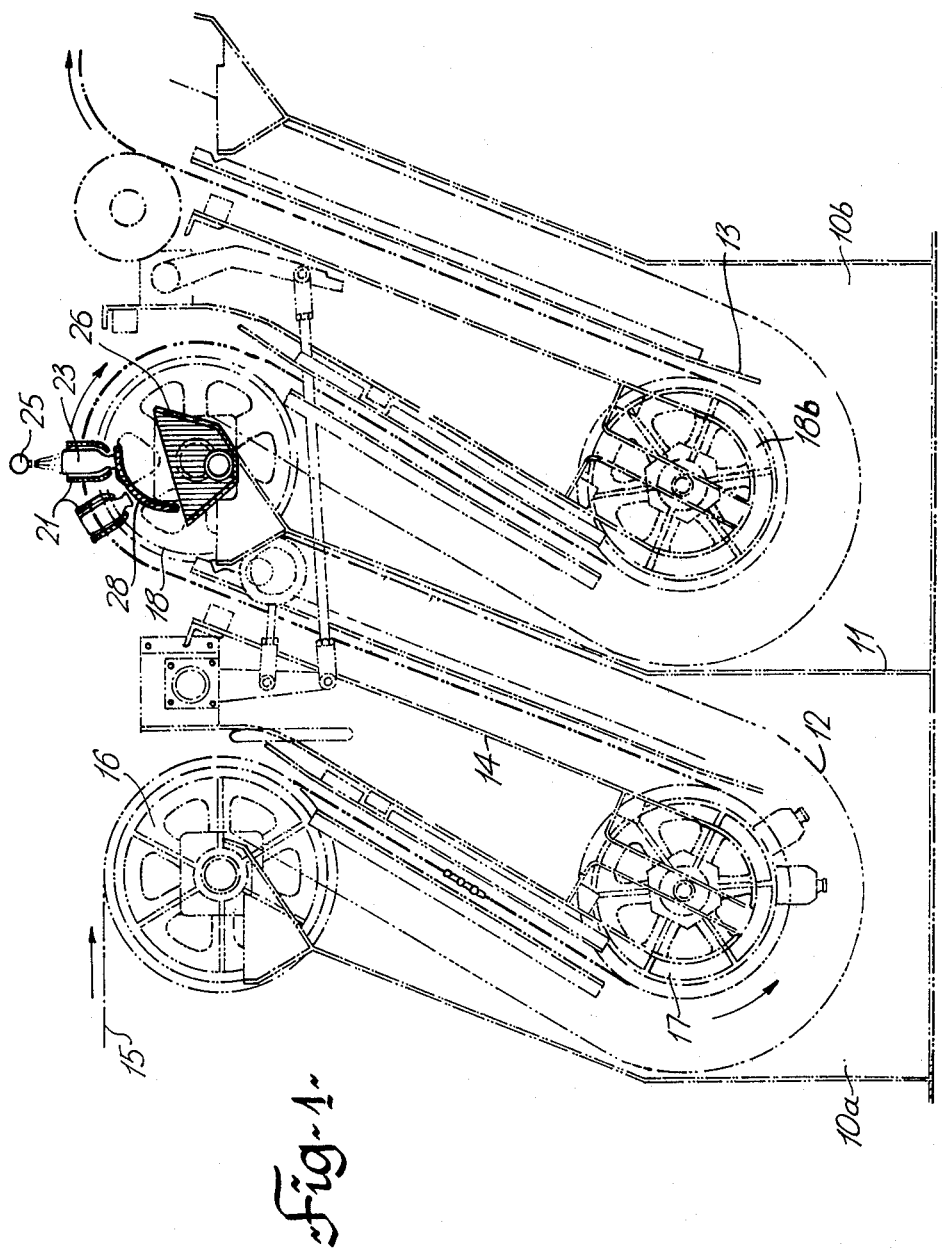

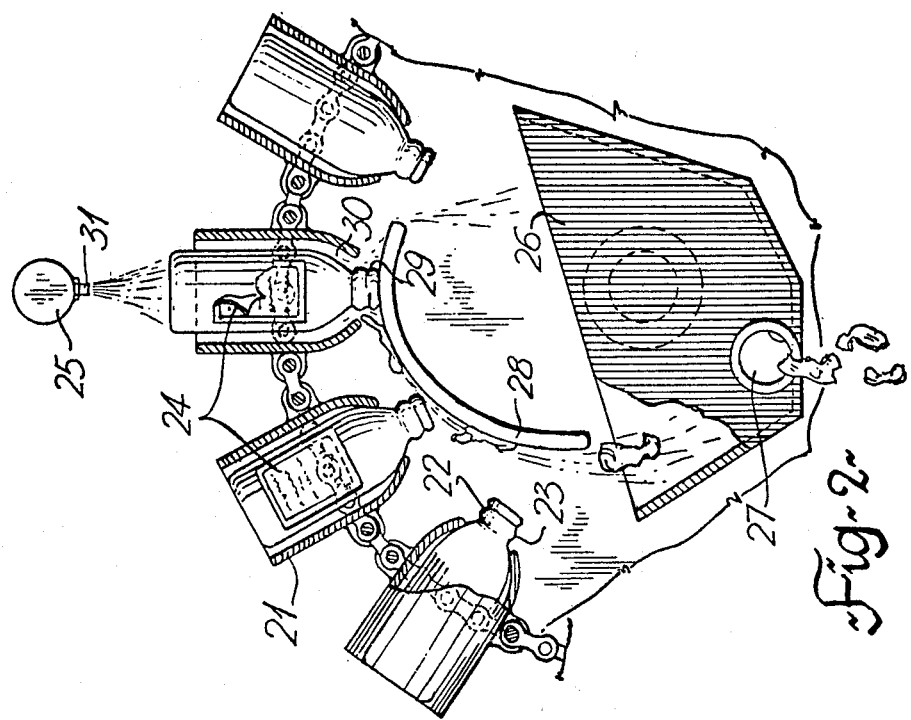
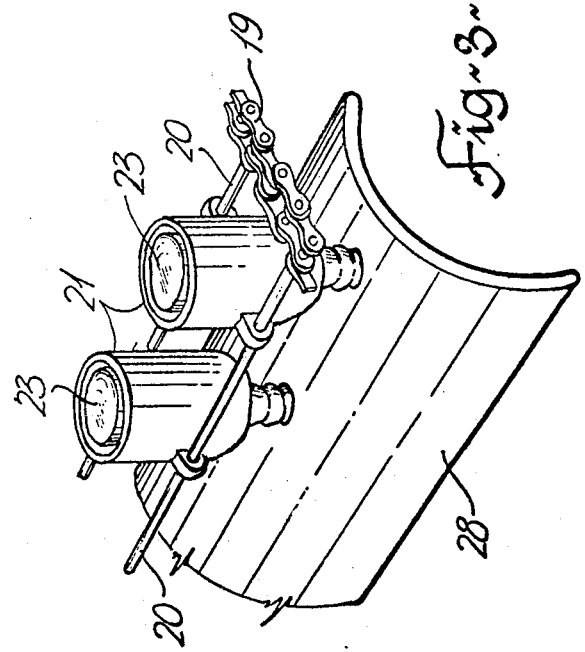

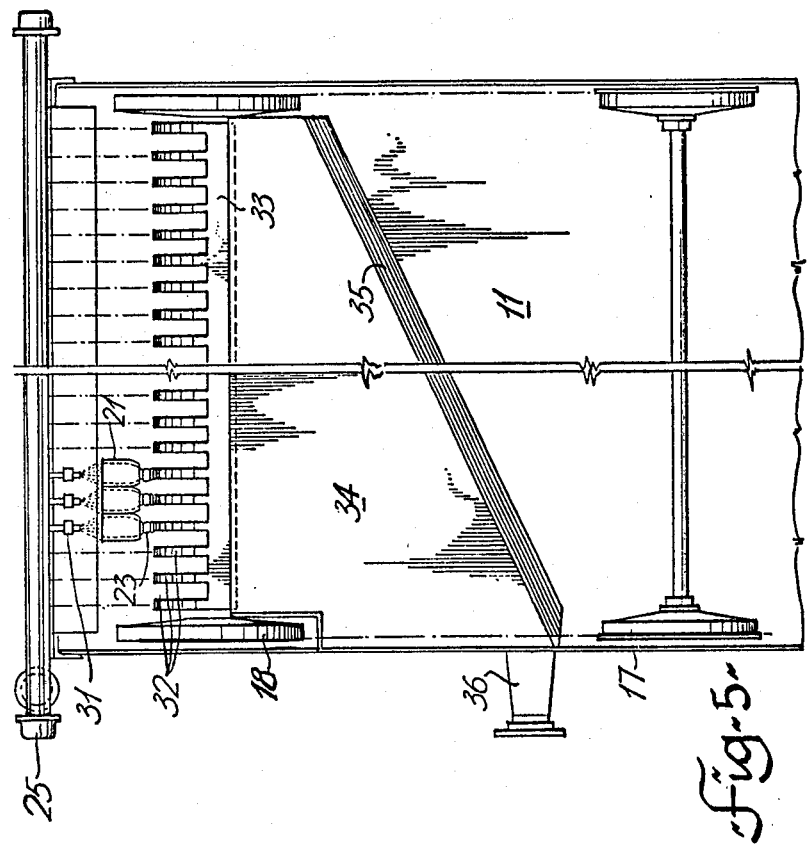
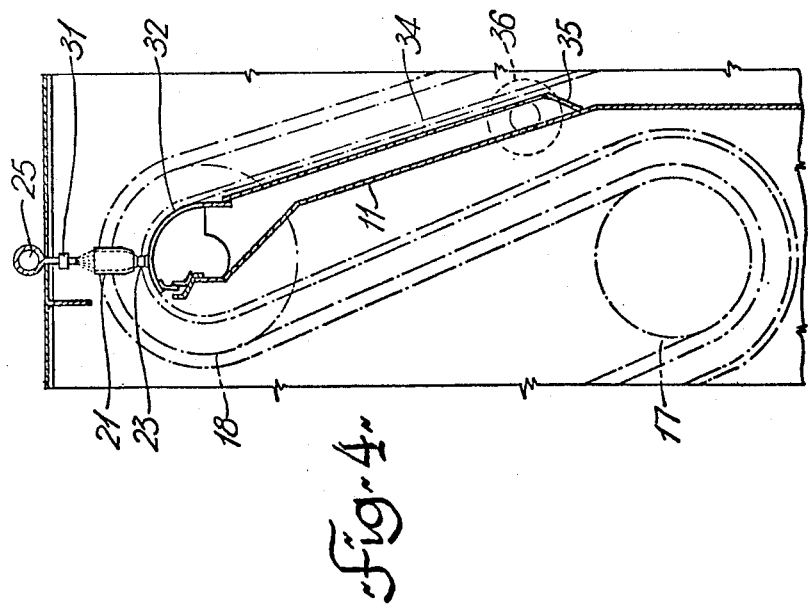

BOTTLE LABEL REMOVING DEVICE

This invention relates to a device for removing labels from returned bottles, e.g. beer bottles.

Used bottles which are returned to a bottling plant must be thoroughly cleaned. As a preliminary step in this cleaning, the bottles are loaded in pockets of a pocket conveyor of known type such as is described in Duff et al, U.S. Pat. No. 3,575,713 and then passed through a succession of treatment tanks which can contain among other things dilute caustic solution. This serves to loosen the labels as well as other extraneous matter on the outsides of the bottles and to loosen various extraneous matter that may be within the bottles. The bottles are typically carried in inverted position in the pockets with the conveyor entering and leaving each tank through an open top. Thus, the bottles pass successively along a downwardly inclined run and thence upwardly about a lower direction changing wheel in a tank and thence downwardly about an upper direction changing wheel between an adjacent pair of tanks into the next adjacent tank. It is the usual procedure to pass the bottles through at least four treatment tanks in the above manner and it has been found that the labels usually remain adhering to the bottles while they pass through the first one or two tanks but separate from the bottles in the later tanks. By this time the labels are pulpy and degraded and they have a highly contaminating effect on the caustic bath. The result is that the later caustic baths must be replaced before they are exhausted because of this buildup of pulpy material from disintegrated labels. In order to do this, the entire apparatus must be shut down.

A system for removing these labels while preventing them from contaminating the caustic solution is, therefore, highly desirable. A quite simple system was attempted which comprises rinsing the label from each bottle as soon as the label was easily removable and it was done by spraying a liquid downwardly onto the bottles as they travelled between treatment tanks and collecting the spray and removed labels in a collecting trough. This system was found to be quite unsatisfactory because the removed labels tended to become lodged within the pockets between the shoulder of the bottle and the pocket and did not pass through into the collecting trough. Of course, as soon as a pocket still holding a label in this manner moved into the next treatment tank, the label floated free to contaminate the tank.

In accordance with this invention, it has been found that the above difficulty can be overcome by providing a cam mechanism which lifts and holds each bottle so that the shoulder of the bottle is out of engagement with the pocket while being sprayed for label removal. With the bottle being held in this position a free passage is provided so that the label travels through the bottom of the pocket directly into the collecting trough. The bottle then returns to its previous resting position in the pocket to continue its travel through the treatment tanks.

The cam mechanism can conveniently be in the form of a stationary, curvilinear surface upon which the mouths of the bottles ride so that the bottles are lifted within the pockets thereby providing a gap between the bottle shoulders and the pockets. The cam mechanism may, if desired or necessary, be adjustable vertically and horizontally in order to accommodate bottles of various neck lengths. Of course, a moveable type of cam could also be used which would engage the bottle mouth while the bottle is being sprayed with the rinsing solution for removing the label.

A preferred embodiment of the apparatus will now be described, reference being had to the accompanying drawings forming a part of this specification.

In the drawings:

FIG. 1 is a side elevation view, in partial section, showing a pair of treatment tanks with the device of the invention installed;

FIG. 2 is a perspective view of two pockets in side-by-side relationship in an inverted position illustrating how the bottles travel on the cam surface;

FIG. 3 is a side elevation, in partial section, illustrating the actual removal and collection of labels;

FIG. 4 is a side elevation view, in partial section, showing details of a commercial installation; and FIG. 5 is an end elevation view, in partial section, of the embodiment of FIG. 4.

Referring now to the drawings, it will be seen from FIG. 1 that there are a pair of upstanding treatment tanks 10a and 10b with open tops separated by divider wall 11. These tanks 10a and 10b include a variety of known guide members 12, 13 and 14. Travelling through the tanks is an endless conveyor 15 which travels on a series of direction changing wheels 16, 17, 18 and 18a.

The conveyor can be in the form of chains 19 with crossbars 20 therebetween and these crossbars support a series of open-ended substantially tubular pockets 21. As can best be seen from FIG. 2, these pockets 21 have inwardly turned lower shoulders 22 which engage the shoulders of bottles 23 while in the inverted position. Thus, it will be seen that the conveyor carries the bottles around wheel(s) 16 and downwardly along an inclined run into tank 10a, around wheel(s) 17 and upwardly along an inclined run out of the tank to wheel(s) 18. It travels around wheel(s) 18 and down a further inclined run into tank 10b and around wheel(s) 18b in a continuing sequence.

As the bottles emerge from tank 10a, the labels 24 have been loosened but are still loosely adhering to the bottle surfaces. Mounted above wheel(s) 18 is a header pipe 25 with a series of spray nozzles 31 which spray downwardly directed jets of a suitable rinsing solution over the surface of the inverted bottles. A particularly suitable nozzle is a Steinen ¼ inch Type 'V' 6.0 65° nozzle. Directly beneath the nozzles 31 is positioned an elongated collecting trough 26 which collects the rinsing solution and labels removed by the rinsing solution. An outlet 27 in trough 26 is provided for the removal of the collected solution and labels.

In order to provide a free passage of the removed labels into the trough 26, a curvilinear cam surface 28 is provided which engage the bottle mouths 29. In this manner the bottles are lifted so as to provide a gap 30 for a free passage of the removed label into trough 26 as clearly shown in FIG. 2.

It will be readily apparent that other forms of cams can be used and the only requirement is that this cam be capable of lifting the bottles at the location shown in FIG. 2 so that there will be an open passageway for the label to be rinsed directly into trough 26 and not carried over into the next treatment tank.

FIGS. 4 and 5 illustrate a commercial installation of adapting the device of the invention to an existing bottle soaking apparatus. As can be seen in FIG. 4, the numeral 11 indicates the dividing wall between two treatment tanks and a curvilinear cam arrangement 32 is positioned above the top end of divider wall 11 so as to engage and lift the bottles while travelling in the inverted position between the two tanks.

As will be seen in greater detail in FIG. 5, the cam device 32 is in the form of a series of relatively narrow curved strips extending upwardly from a common base 33.

Directly beneath this cam arrangement is a collector trough for collecting the solution being sprayed over the bottles by the nozzles 31 and the removed labels. One wall of this collector trough is formed by the divider wall 11 with a further panel 34 being provided as the opposite wall. The bottom of the trough or sluice in this case is formed by a narrow inclined panel 35 which slopes at an angle of about 25° to the horizontal. The lower corner of this trough terminates in an outlet 36 through which the liquid and labels collected in the trough are discharged.

In order to eliminate the possibility of label buildup in the drain side of the system, it is preferable to use a relatively high flow rate, e.g. 300–400 gallons per minute, through the label removal system. Also for effective label removal the pressure of rinse liquid should be relatively high, e.g. about 60–90 psi.

The reuse liquid can conveniently be the caustic solution from the treatment tanks. Before being fed through the spray nozzles, the caustic solution from the tanks is preferably passed through a caustic renovator which removes all solid matter, etc. Of course, the caustic solution being collected in the trough also contains solid matter in the form of labels in varying degrees of disintegration and this solid matter must be separated from the caustic solution before the solution is used either in the treatment tanks or in the spray nozzles.

What we claim is:

1. In a bottle soaking apparatus comprising a pocket conveyor having an endless chain of spaced bottle receiving pocket members moveable along an endless patch, each of said pocket members including an open-ended tubular element adpated to support a bottle in inverted position by engagement with the bottle shoulder, wheel means defining a portion of said endless path wherein said pocket members pass successively along a downwardly inclined run and thence upwardly about a lower direction changing wheel in a soaking compartment and thence downwardly about an upper direction changing wheel into a subsequent soaking compartment, said pocket members being in a generally inverted position as they travel over said upper direction changing wheel, the improvement comprising rinsing means for discharging downwardly directed sprays of a rinsing solution onto said bottles to flush off labels as they travel over said upper direction changing wheel, fluid collecting and discharging means positioned below said pocket members and sprays to collect rinsing solution and labels and cam means for engaging the mouths of the inverted bottles and lifting the bottle shoulders out of engagement with the pocket members while beneath said sprays to permit passage of the freed labels through the open pocket member lower ends and into the collecting means.

2. An apparatus according to claim 1 wherein the cam means is in the form of a stationary, curvilinear surface upon which the bottle mouths ride while in inverted position, whereby the bottles are lifted within the pockets.

3. An apparatus according to claim 1, wherein the bottles are mounted in lateral rows between a pair of laterally spaced conveyor chains.

4. An apparatus according to claim 3, wherein the spray is an elongated header with a series of downwardly directed spray nozzles positioned over the bottles.

5. An apparatus according to claim 3, wherein the fluid collecting and discharging means is an elongated trough containing a collector outlet.

6. An apparatus according to claim 5, wherein the cam means is in the form of a stationary, curvilinear surface upon which the bottle mouths ride while in inverted position, whereby the bottles are lifted within the pockets.

7. An apparatus according to claim 3, wherein the cam means is in the form of a stationary, curvilinear surface upon which the bottle mouths ride while in inverted position, whereby the bottles are lifted within the pockets.

* * * * *